United States Patent
Suenbuel et al.

(10) Patent No.: US 10,515,154 B2
(45) Date of Patent: Dec. 24, 2019

(54) SYSTEMS AND METHODS FOR NATURAL LANGUAGE PROCESSING USING MACHINE-ORIENTED INFERENCE RULES

(71) Applicants: Asuman Suenbuel, San Jose, CA (US); Richard Waldinger, Palo Alto, CA (US); Vishal Sikka, Los Altos, CA (US); Kyle Richardson, Nashua, NH (US)

(72) Inventors: Asuman Suenbuel, San Jose, CA (US); Richard Waldinger, Palo Alto, CA (US); Vishal Sikka, Los Altos, CA (US); Kyle Richardson, Nashua, NH (US)

(73) Assignee: SAP SE, Walldorf (DE)

( * ) Notice: Subject to any disclaimer, the term of this patent is extended or adjusted under 35 U.S.C. 154(b) by 331 days.

(21) Appl. No.: 14/538,642

(22) Filed: Nov. 11, 2014

(65) Prior Publication Data
US 2015/0261744 A1    Sep. 17, 2015

Related U.S. Application Data

(60) Provisional application No. 61/951,800, filed on Mar. 12, 2014.

(51) Int. Cl.
*G06F 17/28* (2006.01)
*G06F 17/27* (2006.01)
(Continued)

(52) U.S. Cl.
CPC ...... *G06F 17/2785* (2013.01); *G06F 16/3329* (2019.01); *G06F 17/271* (2013.01);
(Continued)

(58) Field of Classification Search
CPC .......... G06F 17/2872; G06F 17/30654; G06F 17/27; G06F 17/30663
(Continued)

(56) References Cited

U.S. PATENT DOCUMENTS

| 6,081,774 A * | 6/2000 | de Hita ............. G06F 17/30663 704/9 |
| 2012/0078888 A1 * | 3/2012 | Brown .............. G06F 17/30654 707/723 |

(Continued)

OTHER PUBLICATIONS

Bobrow, Daniel, et al., "Deducing Answers to English Questions from Structured Data", Proceedings of the International Conference on Intelligent User Interfaces, (2011), 4 pgs.

(Continued)

*Primary Examiner* — Farzad Kazeminezhad
(74) *Attorney, Agent, or Firm* — Schwegman Lundberg & Woessner, P.A.

(57) ABSTRACT

Systems and methods are presented for performing natural language processing and reasoning. In some embodiments, a computer-implemented methods is presented. The method may include accessing a natural language query from a user, parsing the natural language query into a computer-interpretable semantic representation, converting the semantic representation into a computer-interpretable logical syntax, determining a solution to the computer-interpretable logical syntax using a reasoning engine and at least one data source, and outputting an answer to the natural language query using the solution to the computer-interpretable logical syntax.

20 Claims, 10 Drawing Sheets

(51) Int. Cl.
  *G06F 16/332* (2019.01)
  *G06N 5/04* (2006.01)
(52) U.S. Cl.
  CPC .......... *G06F 17/27* (2013.01); *G06F 17/2872* (2013.01); *G06N 5/04* (2013.01)
(58) Field of Classification Search
  USPC ........................................................... 704/9
  See application file for complete search history.

(56) References Cited

U.S. PATENT DOCUMENTS

2013/0019286 A1\* 1/2013 Barborak ................ G06F 17/27
  726/4
2013/0282363 A1\* 10/2013 Fan ..................... G06F 17/2872
  704/9

OTHER PUBLICATIONS

Richardson, Kyle, et al., "English Access to Structured Data", Fifth IEEE International Conference on Semantic Computing (ICSC), (2011), 8 pgs.

\* cited by examiner

QUERY: Show me a list of clients with high debts.

Response from parser is:
```
'(("input Show me a list of clients with high debts.")
(top_level company_2 0)
(quant exists company_2 sort company)
(quant exists debt_4 sort debt)
(exists_group ex_grp_45 (debt_4))
(scopes_over nscope company_2 ex_grp_45)
(in nscope debt_4 (qlabel debt_4 high))
(in nscope debt_4 (company-has-debt company_2 debt_4))
)'
```

Response from reasoning engine is:
' "
CONJECTURE
for NIL there exists a company_2 such that
   there exists a debt_4 such that
      debt_4 is a debt,
      company_2 is a company,
      debt_4 is high and
      company_2 has debt_4
(PROVED---
 ((SL-FOOD-INC.
   (DEBT-RECORD SL-FOOD-INC. 105263552 (DATE-POINT 2007 9)))
  (BECK-SPORTS (DEBT-RECORD BECK-SPORTS 74710928 (DATE-POINT 2007 9)))
  (JOANNE-CANELA
   (DEBT-RECORD JOANNE-CANELA 47126760 (DATE-POINT 2007 9))))

Output is:

the company's debt is a debt,
    sl-food-inc. is a company, the company's debt is high and
    sl-food-inc. has
       the company's debt the company's debt is a debt,
    beck-sports is a company, the company's debt is high and
    beck-sports has
       the company's debt

*FIG. 5*

> QUERY: Show me a list of clients with high debts. Show only the Swiss companies.

Response from parser is:
```
'(("input Show me a list of clients with high debts. Show only the Swiss
companies <end>")
(top_level company_8 0)
(top_level company_4 0)
(definite company_8)
(quant exists company_8 sort company)
(quant exists company_4 sort company)
(quant exists debt_6 sort debt)
(exists_group ex_grp_45 (debt_6))
(scopes_over nscope company_8 ex_grp_45)
(in nscope debt_6 (qlabel debt_6 high))
(in nscope debt_6 (company-has-debt company_4 debt_6))
(in nscope company_8 (qlabel company_8 Swiss))
)'
```

Response from reasoning engine is:
' "
CONJECTURE
for NIL there exists a company_4 such that
   there exists a debt_6 such that
      debt_6 is a debt,
      company_4 is a company,
      company_4 is swiss,
      debt_6 is high and
      company_4 has debt_6
(PROVED---
 ((SL-FOOD-INC.
    (DEBT-RECORD SL-FOOD-INC. 105263552 (DATE-POINT 2007 9)))
   (CANDID-CORPORATE-COPIERS
    (DEBT-RECORD CANDID-CORPORATE-COPIERS 5057181/5
      (DATE-POINT 2007 9)))))
( Output is:
         the company's debt is a debt,
      sl-food-inc. is a company,
      sl-food-inc. is swiss, the company's debt is high and
      sl-food-inc. has
         the company's debt the company's debt is a debt,
      candid-corporate-copiers is a company,
      candid-corporate-copiers is swiss, the company's debt is high and
      candid-corporate-copiers has
         the company's debt)

*FIG. 6*

QUERY: Show me a list of clients with high debts. Show only the Swiss companies. Which of the companies owe more than 1 million Euros?

Response from parser is:
```
'(("input Can you get me a list of SAP clients who have a high debt ? Show
only the Swiss companies <end> Which of the companies owe more_than_1000000
Euros ?")
(top_level company_11 0)
(top_level company_2 0)
(top_level company_15 0)
(definite company_15)
(definite company_11)
(quant (complex_num more than 1000000 euro) money_amount_8 sort money_amount)
(quant exists debt_23 sort debt)
(quant exists company_11 sort company)
(quant exists company_2 sort company)
(quant exists company_15 sort company)
(quant exists debt_4 sort debt)
(exists_group ex_grp_45 (money_amount_8 debt_23 debt_4))
(scopes_over nscope company_11 ex_grp_45)
(in nscope debt_23 (company-has-debt company_15 debt_23))
(in nscope company_11 (qlabel company_11 Swiss))
(in nscope debt_4 (company-has-debt company_2 debt_4))
(in nscope money_amount_8 (debt-has-money-value debt_23 money_amount_8))
(in nscope debt_4 (qlabel debt_4 high))
)'
```

*FIG. 7A*

QUERY: Show me a list of clients with high debts. Show only the Swiss companies. Which of the companies owe more than 1 million Euros?

Response from reasoning engine is:

```
( "
CONJECTURE there exists a company_2 such that
    there exists a money_amount_8 such that
        there exists a debt_23 such that
            there exists a debt_4 such that
                debt_4 is a debt,
                debt_23 is a debt,
                company_2 is a company,
                company_2 is swiss,
                money_amount_8 is more-than
                    1000000 euros,
                the amount of debt_23 is money_amount_8,
                company_2 has debt_23,
                company_2 has debt_4 and
                debt_4 is high
(PROVED----
 ((SL-FOOD-INC. 105263552
    (DEBT-RECORD SL-FOOD-INC. 105263552 (DATE-POINT 2007 9))
    (DEBT-RECORD SL-FOOD-INC. 105263552 (DATE-POINT 2007 9))))))
( Output is:
                the company's debt is a debt, the company's debt is a debt,
            sl-food-inc. is a company,
            sl-food-inc. is swiss,
            105263552 is more-than
                1000000 euros,
            the amount of
                the company's debt is 105263552,
            sl-food-inc. has
                the company's debt,
            sl-food-inc. has
                the company's debt and the company's debt is high)
" )
```

*FIG. 7B*

SYSTEMS AND METHODS FOR NATURAL LANGUAGE PROCESSING USING MACHINE-ORIENTED INFERENCE RULES

CROSS REFERENCE TO RELATED APPLICATION

This application claims the benefits of U.S. Provisional Application 61/951,800, filed Mar. 12, 2014 and titled "SYSTEMS AND METHODS FOR NATURAL LANGUAGE PROCESSING," the disclosure of which is hereby incorporated herein in its entirety and for all purposes.

TECHNICAL FIELD

The subject matter disclosed herein generally relates to the processing of natural language queries. In some example embodiments, the present disclosures relate to systems and methods to facilitate natural language processing and reasoning.

BRIEF DESCRIPTION OF THE DRAWINGS

Some embodiments are illustrated by way of example and not limitation in the figures of the accompanying drawings.

FIGS. 5, 6, 7A, and 7B are example natural language queries and example outputs, according to some example embodiments.

DETAILED DESCRIPTION

Figure 1:
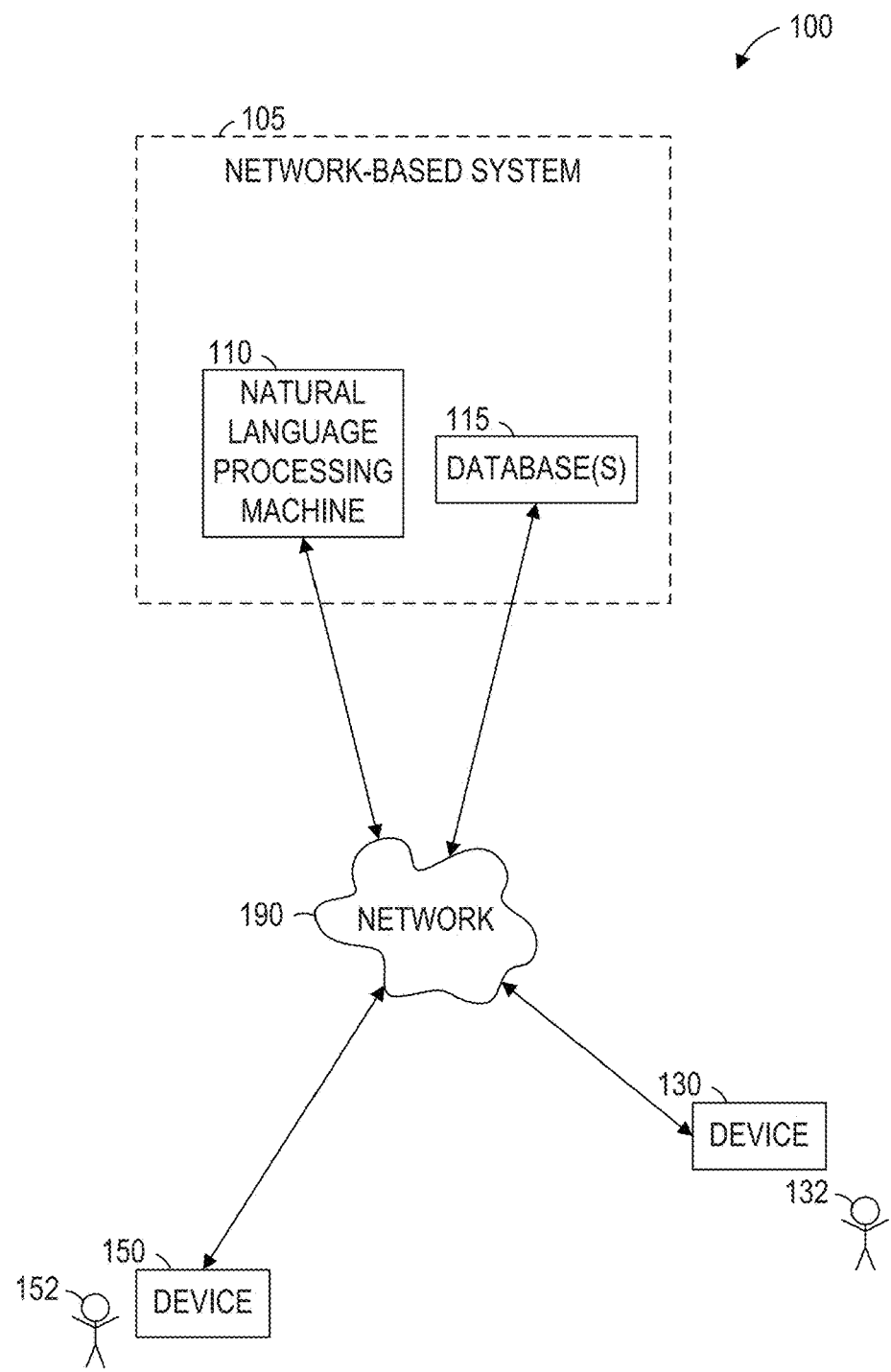
FIG. 1 is a network diagram illustrating a network environment suitable for natural language processing, according to some example embodiments.

Example methods, apparatuses and systems are presented for processing natural language queries. As used herein, the term "natural language" may refer to types of written or verbal communications that are used by humans arising from the innate facility for language possessed by the human intellect. Natural language may also be referred to as "ordinary language," and may be contrasted with constructed languages, such as computer programming languages. As such, it may be commonly known that natural languages possess syntax and grammar that, unless otherwise converted or translated, cannot be comprehended using constructed languages. Examples of natural language include English, Spanish, and Mandarin, while examples of constructed languages include Java, SQL, and Python. Thus, it is generally acknowledged that humans more intuitively understand at least one natural language before any constructed language, while computers typically have been created with the opposite understanding in mind—that is, computers are created to comprehend at least one constructed language before any natural language.

The present disclosures discuss methods for a computer to accept as an input a natural language query, process the query, and output an answer to the query without intervening human input or additional programming. Since the inception of computer development, it has been a desire to make computers understand ordinary human language. However, what seems very intuitive and basic to a human has proven to be quite difficult for computers, as a number of limitations still persist in even current natural language processors. For example, current implementations for answering a natural language query may involve programming scripted responses and/or heuristics. This approach not only limits the number of responses, but also does not represent an authentic comprehension of natural language, due to its scripted nature. Other times, a question or query posed to the computer must be phrased in such a way so as to fit exactly into the constructs of a programming language, such as SQL. A drawback to this approach, however, is that it may be difficult to express complex natural language queries in a language like SQL, due to limitations in the expressive power of such languages.

Other problems in natural language processing persist. For example, a natural language input can mean different things in different contexts. A computer may need to appreciate the context similar to what a human might in order to correctly address the query. Conversely, multiple queries may be worded differently but may still be intended to ask the same question. The computer engine would need to know how to address differently worded queries with identical intent.

Moreover, in some implementations, natural language processing involves accessing one or more databases of information and linking, associating, and/or matching multiple entries from the different databases together. Problems may arise when trying to associate information from one database with another if the entries in the database do not match or use different naming conventions.

The present disclosures solve these and other problems by combining natural language parsing with a logical reasoning engine. In some example embodiments, a computer-implemented method is presented. The method may include accessing a natural language query from a user, parsing the natural language query into a computer-interpretable semantic representation, converting the semantic representation into a computer-interpretable logical syntax, determining a solution to the computer-interpretable logical syntax using a reasoning engine and at least one data source, and outputting an answer to the natural language query using the solution to the computer-interpretable logical syntax. These and other example embodiments are also presented, further details of which are described herein, below.

Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Referring to FIG. 1, a network environment 100 is presented, which may be one example implementation of how the present disclosures interact with one or more users, according to some example embodiments. The network environment 100 includes a network-based system 105, containing a natural language processing machine 110, one or more databases 115, and devices 130 and 150, all communicatively coupled to each other via a network 190. The natural language processing machine 110 may form all or part of the network-based system 105 (e.g., a cloud-based server system configured to provide one or more services to the devices 130 and 150). The natural language processing machine 110 and the devices 130 and 150 may each be implemented in a computer system, in whole or in part, as described below with respect to FIG. 9.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but may be associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but may be associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software. In other cases, the present disclosures may not utilize a network, in the sense that the natural language processing and reasoning systems may be self-contained in one or more machines not connected to a network, and embodiments are not so limited.

Figure 2:
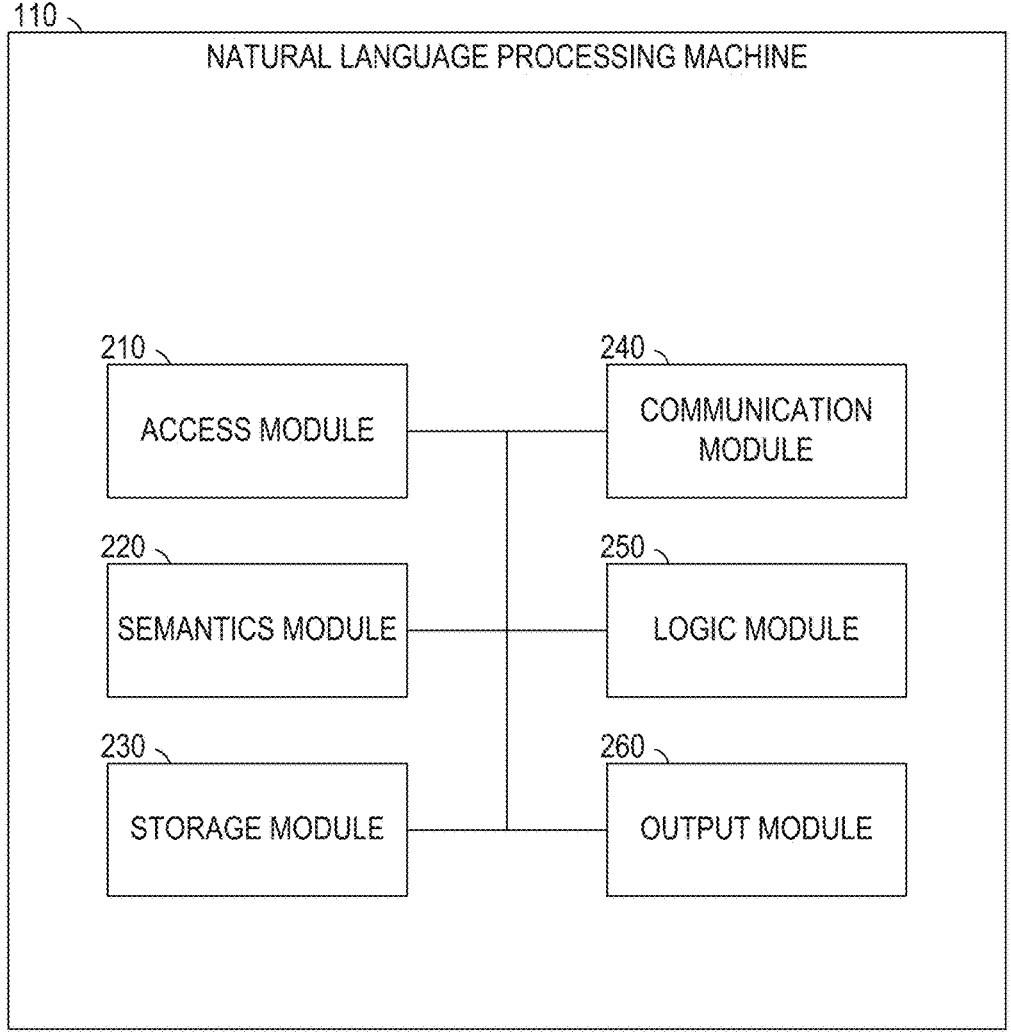
FIG. 2 is a block diagram illustrating components of a server machine suitable for natural language processing, according to some example embodiments.

Referring to FIG. 2, the block diagram shown illustrates components of the natural language processing machine 110, according to some example embodiments. As used herein, the term "machine" may refer to hardware, software, firmware or any combination thereof. The natural language processing machine 110 is shown as including an access module 210, a semantics module 220, a storage module 230, a communication module 240, a logic module 250, and an output module 260, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
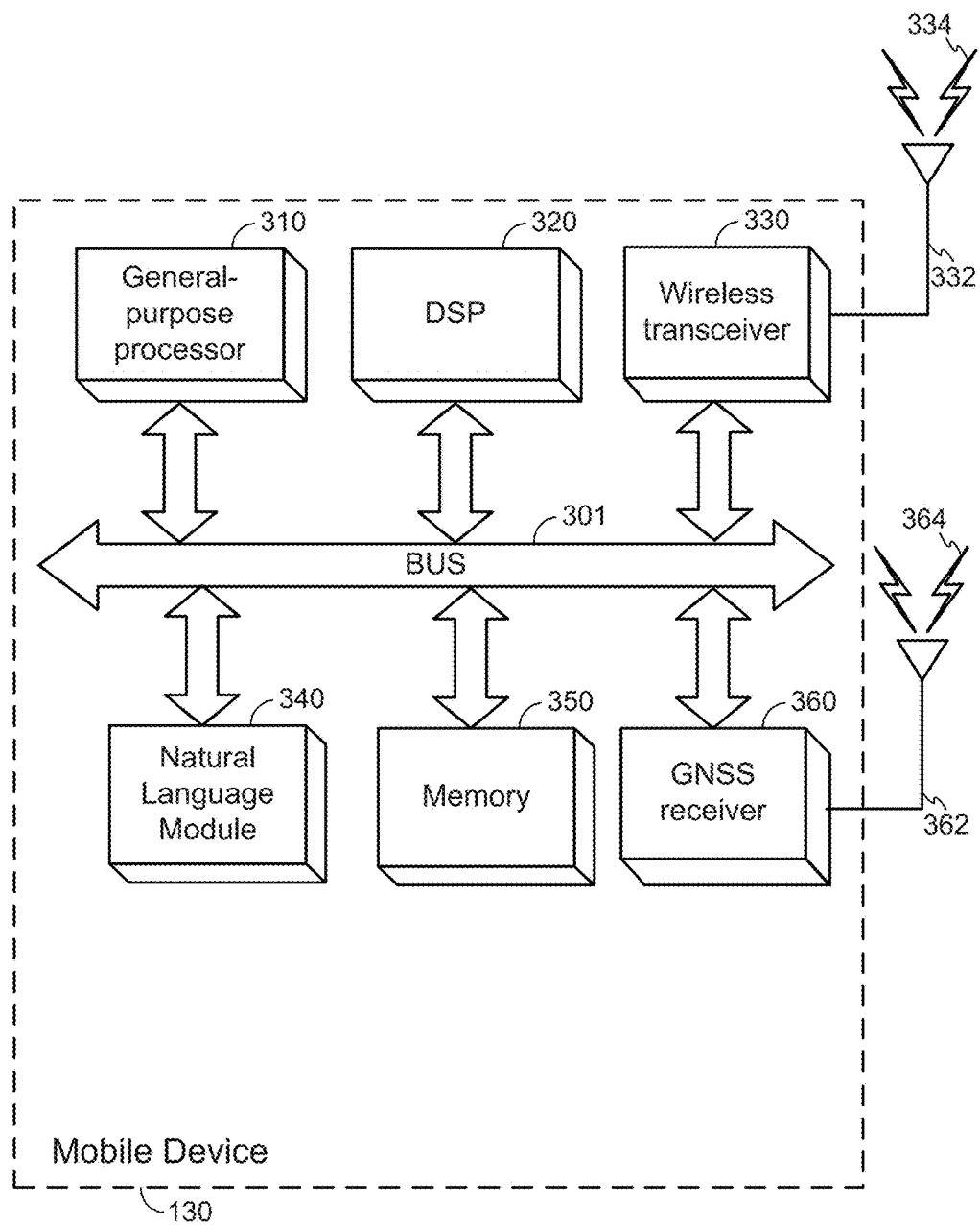
FIG. 3 is a block diagram illustrating components of a mobile device suitable for natural language processing, according to some example embodiments.

Referring to FIG. 3, the block diagram shown illustrates example details of device 130, illustrated herein as a mobile device according to some example embodiments. The mobile device 130 may include one or more wireless transceivers 330 connected to bus 301. The wireless transceiver 330 may be operable to receive wireless signals 334 via antenna 332. The wireless signal 334 may be transmitted via a wireless network, for example network 190. Mobile device 130 may also be configured to decode and/or decrypt, via the DSP 320 and/or general purpose processor 310, some or all of the information provided by the wireless transceiver. For example, responses from the natural language machine 110 may be transmitted to mobile device 130 and may be decoded by DSP 320 and/or general purpose processor 310. Responses from natural language machine 110 may in turn be stored in memory 350. Optionally, mobile device 130 may contain addition modules, such as a global navigation satellite system (GNSS) receiver 360 capable of receiving GNSS signals 364 via a GNSS antenna 362 coupled to the GNSS receiver 360.

In some example embodiments, rather than receive responses remotely from a natural language processor machine 110, mobile device 130 may include a natural language module 340 configured to conduct natural language processing according to at least some of the present disclosures. Natural language module 340 may include some or all of the modules described in FIG. 2, and/or some or all of the modules described in FIG. 4, described more below, as examples. Natural language module 340 may be implemented in hardware and/or software, and embodiments are not so limited. Database information used in the natural language processing may be stored in memory 350.

The mobile device 130 may be a cellphone, smartphone. PDA, tablet, laptop, tracking device or some other wireless supportable and moveable device and may be referred to as a mobile terminal, mobile station (MS), terminal, device, wireless device, user equipment (UE), SUPL Enabled Terminal (SET), target device, target or by some other name.

Figure 4:
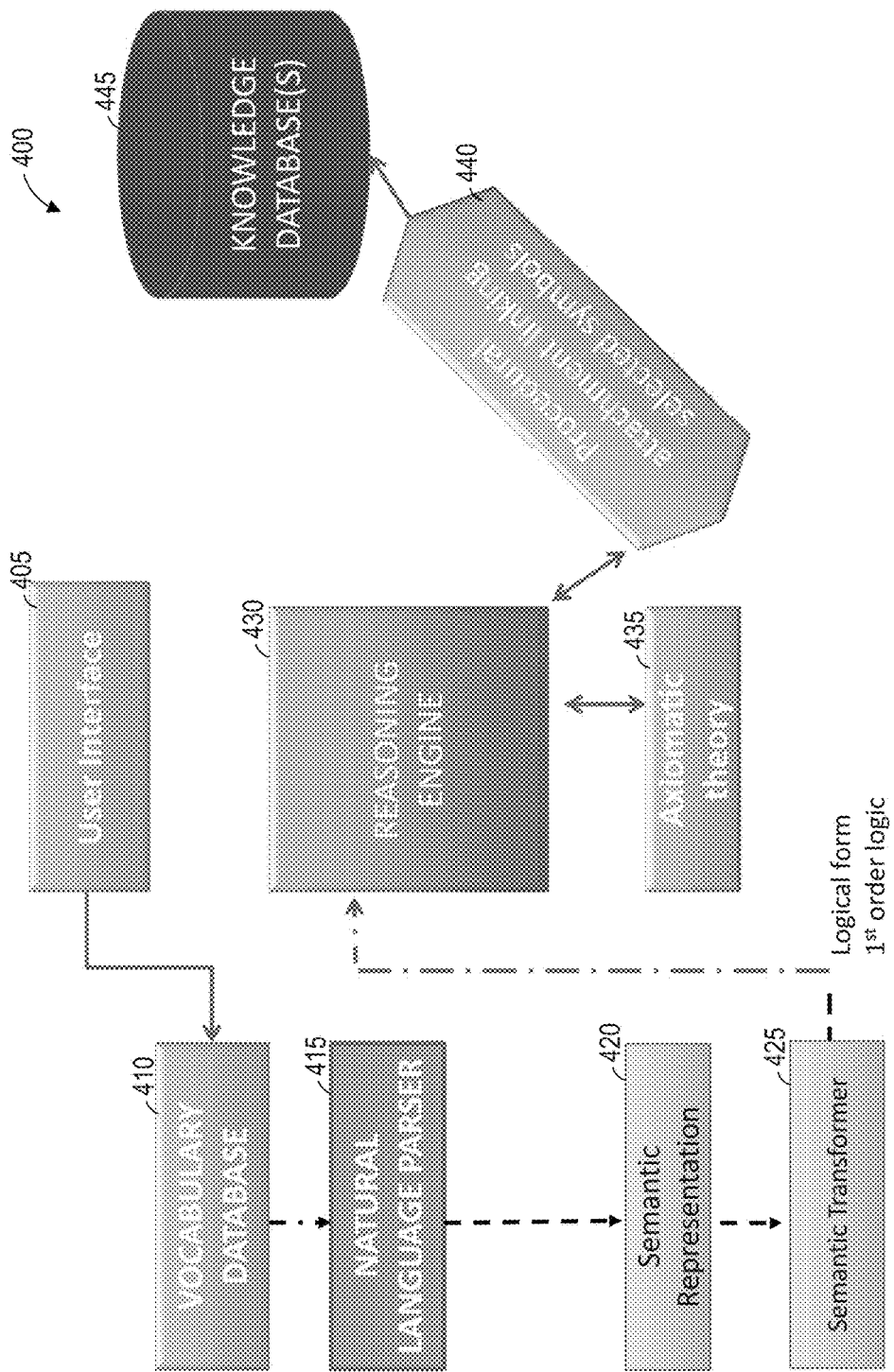
FIG. 4 is a block diagram illustrating components of a natural language processor, according to some example embodiments.

Referring to FIG. 4, further example implementation details of a process flow for natural language processing are shown in illustration 400. In some embodiments, starting at user interface block 405, a user may input a query or question. The query or question may contain multiple requests for information. For example, the query may contain more than one question. The user input may be worded in natural (or ordinary) language, including having a grammatical and syntactical structure that the user would use in any ordinary conversation. For example, a user may type the query, "Show a company with a debt of more than 100 million dollars." Notice the query need not be written in a question format, and is written in conventional English, including conventional English syntax. As another example, a user may type the query, "Show a company with a debt of more than 100 million dollars. What is the nationality of the client?" In this case, the query is effectively two requests for information: a company with a debt of more than 100 million dollars, and the nationality of said company. Notice also that the term "client" is used in the second sentence, rather than "company," which is used in the first sentence. Natural language processors of the present disclosures may be configured to deduce that "client" and "company" refer to the same entity, based on the context of the query.

The user input may be supplied to a vocabulary database 410. The vocabulary database 410 may be customizable, and may include a vast array of definitions and relationships, perhaps not unlike a vocabulary a human may know and understand. For example, the vocabulary database 410 may include many root or base definitions, as well as many synonyms and antonyms that may link or connect relationships of many words together. In some embodiments, the database 410 may be viewed or referred to as a lexicon database. The database 410 may specify the types of entities that exist in a particular domain (e.g. "debt," "company," "enterprise," "time-entity," etc.), the words that constitute these entities (e.g. debt(EN)=debt(ENTITY), month(EN) =time-entity(ENTITY), etc.), and the abstract relationships that hold between different entities (e.g. company entities relate to debt entities since companies have debts, debt entities relates to time entities since debts have durations).

Natural language parser 415 may utilize vocabulary database 410 in order to parse the query from the user interface 405. The parser 415 may follow predefined rules of grammar and syntax for the natural language the query is written in. For example, the parser 415 may identify verb to subject relationships, subdivide the query into appropriate clauses based on identified conjugations and declensions, and so on. Thus, the natural language parser 415 may rewrite and/or store the user's query as a semantic representation 420, which may be in a format better organized for the natural language processor. In some embodiments, the semantic representation 420 provides a description of the query, including the logical relations and the connectives and quantifiers that relate them. In some example embodiments, the parser may be a bottom-up syntactic chart parser—i.e. it may use dynamic programming and a syntactic grammar to search, from the words up, for all possible grammatical relations that hold between subspans (e.g., words, phrases) in a given language input. Alternative techniques/parsing strategies known in the art could also be used (e.g. top-down parsing strategy, a probabilistic parser that may perform pruning, etc).

In general, the parser 415 may use the entity and relation information from the lexicon/vocabulary database 410 to prune the results of the parser, and find/rewrite syntactic patterns to semantic patterns that are part of the target logical form. Take for example, the sentence "find a company with a debt from last year." It should be noted that this sentence has an ambiguity, in that it is not clear whether "from last year" is modifying "a debt" or "a company," e.g. whether the debt is from last year, or it is a company that existed last year. The syntactic parser 415 may find grammatical patterns between [Company (from last year)] and [debt (from last year)], knowing that there is a relationship between debt (=DEBT) and last year(TIME-ENTITY) from the lexicon/vocabulary database 410. This may allow the parser 415 to prune out the first possibility (i.e. [company (from last year)]), and keep the second (i.e. [debt (from last year)]) when parsing. Once such patterns are found, the patterns can be mapped onto semantic relations (e.g. debt-has-duration), which may form the basis of the logical form. Example mechanisms for pruning results of the parser with the lexicon/vocabulary database 410 may range from purely rule-based systems to statistical systems that use machine learning, and embodiments are not so limited.

The semantic representation 420 of the user's query may then be transformed into a logical format via semantic transformer 425. In some embodiments, this transformation may include a number of stages. For example, the natural language query may be parsed into a parse tree, which may then be transformed into a semantic representation. Then, the semantic representation may be translated into a logical form, in that the semantic representation may be converted into a string of words and other symbols (e.g., brackets, parentheses, colons) that captures the meaning of the query expressed in a reliable logical form. The logical format of the user's query may be supplied to reasoning engine 430, which may conduct automated deductive reasoning in an attempt to find an answer to the user's query. In some embodiments, the reasoning engine 430 utilizes development of a logical or axiomatic theory of relationships between terms used in the user's query, which is represented as axiomatic theory block 435. This theory may include a vocabulary of symbols and a set of axioms, e.g. declarative sentences in a logical language. These axioms may define the meaning of the concepts in the query, specify the capabilities of the data sources, and may provide the background knowledge necessary to relate them. For example, a human may need to learn a large amount of medical terminology, including their logical relationships to other medical (and even rudimentary, everyday) terms, in order to answer questions related to the medical field. In general, many fields of study (e.g. archaeology, geology, chemistry, etc.) and professional disciplines (e.g. carpentry, computer science, logistics, law, medicine, teaching, etc.) include their own sort of vocabulary and corresponding logical relationships between terms. In a similar way, the computer implemented embodiments of the present disclosures may be initially programmed or taught the logical relationships between terms for one or more fields of study and/or professional disciplines.

In general, according to some embodiments, the process of transforming the semantic representation 420 into a logical format may include interpreting and handling various logical connectives, e.g. "or," "not," "and," etc. In addition, this process may also include interpreting and handling language quantifiers, e.g., "for all," "there exists," etc.

In some embodiments, the axiomatic theory block 435 may enable the reasoning engine to classify entities or terms in a query according to an ontology of the process or domain. For example, in the enterprise industry, distinctions may be made between companies, nationalities, debts, and dates. For each relation in the theory, a declaration species may represent the set of arguments; e.g., the relation company-has-debt has a company as its first argument and a debt as its second. The meaning of the relations may be defined by axioms in the theory. The axiomatic theory may thus be used for both parsing the query and answering it.

The reasoning engine 430 may access one or more knowledge databases 445 in order to determine an answer to the query. In some embodiments, the reasoning engine may rely on symbols or codes linked to terms from the query in order to find proper relationships in the databases, via procedural attachment mechanism block 440. For example, in the above example query, the term "client" and the term "company" are meant to refer to the same entity. Thus, a single symbol may be associated with both "client" and "company," and the reasoning engine may search for corresponding terms in the knowledge database(s) 445 linked with the same symbol, even if the actual words are different. In addition, the procedural attachment mechanism 440 may allow for additional information to be associated with the various words in the query. For example, when a symbol appears in the search for a proof, appropriate information from the database may inform the proof search, based on the procedural attachment associated with that symbol. Thus, information from the database may be added to the axiomatic theory when it is needed, thereby acting as a virtual just-in-time extension to the axiomatic theory, in some cases. Furthermore, domain experts can rapidly construct new relation symbols that relate the query with the database, rather than having to rely on a fixed inventory of database relations. These symbols can be defined in the axiomatic theory 435, and link the theory to database content using the procedural attachment mechanism 440. Additional general knowledge useful for query interpretation can be introduced by adding domain-specific axioms.

In some embodiments, a plurality of databases 445 is used. These databases may contain related information but very different terminology and information to each other. In these cases, in some embodiments, the databases may be linked to symbols in the axiomatic subject domain. Some of those symbols might match the symbols being searched for by the reasoning engine 430, or at least be sufficiently relevant, during the proof search: at this point, information from the database informs the search for a proof. For example, if the query involves the nationality of a client, the symbol relating nationality to country (e.g. Swiss to Switzerland) may arise, and the corresponding database(s) containing such information would be consulted as the proof search is underway.

In some embodiments, the reasoning engine 430 finds an answer to the query by conducting one or more proofs. A proof may be conducted in the same axiomatic theory used to disambiguate the query. The logical form may be decomposed and transformed according to the axioms of the theory. These axioms may be predefined and based on knowledge of one or more subject domain experts who may program the set of axioms for the subject domain. The reasoning engine 430 may find entities that satisfy a complex relation based on the wording of the query, which may have many conditions. The entities to be found may be represented by variables that are existentially quantified in the logical form. In proving the theorem, a theorem prover replaces these variables by more complex terms; variables in those terms are replaced in turn by other terms, and so on. When the proof is complete, the composition of these replacements indicates an answer that can be extracted from the proof. Typically, there are many proofs for each theorem; each proof may yield a different answer. The reasoning engine may assemble all these answers for presentation to the user. Additionally, the reasoning engine may use machine-oriented inference rules, such as resolution, for general-purpose reasoning, and paramodulation, for reasoning about equality. In some embodiments, there may be special facilities for reasoning about space and time. A procedural attachment mechanism may also allow for linking the axiomatic theory to structured data, and an answer extraction mechanism to construct an answer to the query from the completed proof. As an output, the system described in FIG. 4 may present one or more answers extracted from the proof in a natural language form that is easy to understand by the user.

The example process flow in FIG. 4 may be implemented in various devices, including, for example, system 105, and devices 130 and 150. In some embodiments, the natural language processing machine 110 of FIG. 2 may be used to implement the process flow in FIG. 4. In some embodiments, the knowledge acquired in the systems described in FIG. 4, such as the grammar, syntax and word-relationships for parsing, the knowledge for doing the subsequent reasoning, etc., may be generated through various means, including from machine learning techniques, custom-designed, developer-inputted programming means, library extensions, web-based extensions, and so on, and embodiments are not so limited.

In some embodiments, finding an answer to the query is a refutation procedure; the present disclosures look for inconsistencies in sets of logical sentences. In trying to proof a new conjecture, example embodiments may negate the conjecture, add it to the set of axioms in the theory, and try to show that the resulting set is inconsistent. For this purpose, it may apply inference rules to the negated conjecture and the axioms. The resulting inferred sentences may be added to the set of sentences. Inference rules may then be applied to the new sentences and the axioms. The process may continue until a contradiction is obtained. Because the inference rules are all logically sound, all the sentences obtained follow from the negated conjecture and the axioms. Assuming that the axioms are all true, this shows that the negated conjecture must be false, i,e. the conjecture itself must be true.

In some embodiments, the order the axioms are considered is controlled by a set of heuristic principles, which are predefined. For example, orderings and weights on the symbols may be supplied; this information focuses the attention of the system toward certain symbols before considering other symbols. For example, sentences in the query of lower weight are given higher priority than sentences of a higher weight. Within a given sentence, a relation symbols that are higher in the ordering are attended to before relation symbols that are lower.

In contrast to at least some example embodiments, existing approaches to interpreting language queries focus on very basic question types, and ignore the wider variety of complex linguistic factors that are involved. For example, phenomena such as scope and quantification, temporal reasoning, negation, and world knowledge are often ignored, in part because the target representations are limited to the constructs available in weak languages such as SQL, and the concepts and symbols in the target databases. In contrast, users of the present disclosures can define custom symbols and rules for specifying complex linguistic constraints, in addition to domain-specific relations that relate to database content. Such rules are specified in terms of finite-state transducers, and used to build logical formulas on top of a bottom-up grammatical parsing procedure. Additionally, existing engines may be deal with static entries, lacking an ability to expand understanding of the language in a domain. In contrast, it has been shown in the present disclosures how various embodiments are capable of incorporating additional word relations dynamically, for example through the use of the domain theory development, the procedural attachment mechanism, the ability to expand the vocabulary/lexicon database, and the like.

Referring to FIG. 5, an example query and solution is shown according to some example embodiments. In this first example, a user may enter a query: "Show me a list of clients with high debts." In order to not search exhaustively through all known knowledge across all professional and academic disciplines, queries may be pre-set for one or several particular disciplines. For example, the term "client" in this case may be in the context of a company using the natural language processor of the present disclosures, and thus the database(s) supplied may include a list of clients of the company.

Notice also in this case that the phrase "show me" is used. The term "me" may be vague or ambiguous, but systems of the present disclosures may infer that "me" refers to the user, since that is the context in which the query arises. Additionally, the phrase "show me" may be equivalent to any number of other phrases, including, for example "display," "provide an output for," or "what is a," and so on. In general, it should be apparent that the example query in FIG. 5 can be rephrased in many ways, including in the form of a question, including "How many clients have high debt?" as an example.

Also, notice the term "high" is used to modify the word "debts." Normally, "high" may be an ambiguous term, since it is subjective and lacking in a quantitative value by itself. Nevertheless, example embodiments may deduce or reason a logical or reasonable value to associate with "high" in order to complete the query. In contrast, other natural language parsers and programs may be incapable of accepting such a normally subjective term. Example results are as shown, with an example output response as shown.

Referring to FIG. 6, another example query and solution is shown according to some embodiments. Here, the query includes the query of FIG. 5, plus an additional sentence, "Show only the Swiss companies." In this case, the term "companies" has not been used before in the previous sentence, yet it is clear from the context that "companies" refers to the "clients" mentioned previously. Ordinarily, conventional computer engines may not be capable of deducing such a relationship, while embodiments of the present disclosures may be capable of such.

Additionally, it is known that the term "Swiss" refers to the nationality of the subject. However, conventional computer engines may not readily comprehend that the term "companies" or "clients" possesses an attribute such as "nationality," and thus may not comprehend what it means for a company to "be Swiss." However, here, embodiments of the present disclosures may already understand that the term "clients" or "companies" possesses a "nationality" attribute, and that "Swiss" is a descriptor for the nationality of "Switzerland." Notice that none of these relationships need be defined by the user. Example results may be as shown.

Referring to FIGS. 7A and 7B, another example query and solution is shown according to some embodiments. Here, the query includes the query of FIG. 6, plus an additional question, "Which of the companies owe more than 1 million Euros?" In this case, the user has essentially defined what the term "high" means, without unambiguously linking the term "high" with "more than 1 million euros." In conventional engines, a user may need to declare explicitly, for example, that "high debt=debt greater than 1,000,000 euros." In this case, not only is the natural language parser capable of deducing such a relationship, but the user need not even use the term "high" again in the second sentence in order to establish such a relationship.

Also notice that the phrase "1 million Euros" is used. This phrase is a mix of numbers and words, which altogether should mean "1,000,000 euros" or "one million euros." Even though a mix of numbers and words are used, the present disclosures may be capable of understanding the proper relationship. An example response from the parser is shown in FIG. 7A, while an example response from the reasoning engine subsequent to the parser, and an example output response, is shown in FIG. 7B. In this case, the number of companies satisfying the conditions in the query has been narrowed down to only one company.

In some embodiments, multiple databases may be invoked in order to generate an answer to the query. For example, referring to the query of FIGS. 7A and 7B, in some embodiments, four separate databases may be used, since each database does not contain all the information necessary to derive an answer: a currency conversion website, an enterprise database containing a list of enterprise clients, a database of countries and their corresponding nationalities, and another of countries verses country codes. In other embodiments, databases may be combined or merged, and in general the actual number of databases is not limiting.

In some embodiments, multiple pieces of information from one or more databases may be utilized to generate an answer that is not explicitly found in the one or more databases. For example, a query may ask "What client has the highest profit? What is its profit margin?" The natural language engine may need to access only one database of enterprise clients showing a list of profits and revenue. However, the database may not contain a category or column for profit margin, only a column for profit and a column for revenue. Nevertheless, the natural language engine may already have a predefined calculation for computing "profit margin," such as (profit/revenue). The natural language engine may also know how to conduct comparisons when it sees a word like "highest," and thus it may be able to provide an answer for a client's profit margin, even though there does not exist a column or entry in the database containing such a term.

In some embodiments, certain information from predefined databases may not provide all the information needed to obtain an answer. In these cases, the natural language engine may have the capability of accessing ancillary sources of data or information. For example, the natural language engine may access websites of common rate conversions or websites containing vocabulary in certain fields of discipline.

For purposes of clarity and by way of example, a number of language interpreting engines commonly available and known are distinguishable from aspects of the present disclosures. The following are several examples:

1. SIRI like approaches: These are based on a knowledge navigator, which capture natural language input and then perform database lookups, the link between a SIRI-like natural language parser and any database does not involve any general purpose reasoning engine. In other words, SIRI attempts to simply look up and match information associated with the query to a term in a database in order to answer a question. In contrast, the present disclosures include a reasoning engine that is capable of performing logical deduction after the user's query has been semantically parsed. Furthermore, it is difficult to add new knowledge to a SIRI-like system without reprogramming it. In contrast, a query answered by aspects of the present disclosures may contain a new definition or term (e.g., see FIG. 6), and may be immediately incorporated into answering the query.

2. Watson super-computer: Watson does not try to get a comprehensive understanding of the natural language. Rather, Watson identifies relevant knowledge sources, in essence relying on word association rather than understanding. For example, during Watson's famous "Jeopardy!" performance, Watson was programmed to access mainly articles from Wikipedia.org, since the programmers deduced that most Jeopardy! clues were derived from Wikipedia. Watson then searched for relevant word associations from the clue to the Wikipedia articles and outputted a statistical "best guess," but performed no reasoning and made no attempt to logically deduce or understand the Jeopardy!® clues. This was made alarmingly clear in a few notable examples. In one case, Watson provided an answer of "What is Toronto?" when the clue referred to a U.S. city with airports. Clearly, Toronto is not a U.S. city at all, but it still was the best answer among those generated. In another instance: a clue referred to the 1904 Olympics, where a medal winner of gymnastics had only one leg. Watson was asked what was unusual about it, Watson knew that he had one leg, but it didn't know that this was unusual. In contrast, aspects of the present disclosures are capable of reasoning such terms to know that having one leg in gymnastics may be considered unusual, for example.

Additionally, Watson is also not concerned with follow up questions, including basing an answer to one question off of the answer to a previous question. In contrast, aspects of the present disclosures are capable of incorporating answers to previous questions in one query to answer additional questions in the same query (see e.g., FIGS. 6, 7).

3. Google search engine: Search engines like Google are mostly doing matching of words without any reasoning or logical deduction. Newer nuances to Google have template questions; e.g; what time something is playing, built in smart answers, they want to see the trailer, gives a standard answer, but it does not have similar capabilities for reasoning. General capability of a Google-like search engine is not to give well-structured answers.

4. Wolfram Alpha is a computational knowledge and a search engine. It gives the user access to the world's facts and data and calculates answers across a range of topics, including science. Its question/answering may be similar to a Google-like search engine, including template answers to question, and structured data lookup. Also, Wolfram Alpha does not construct a logical form or try to understand the question, as it does not have general purpose reasoning.

Figure 8:
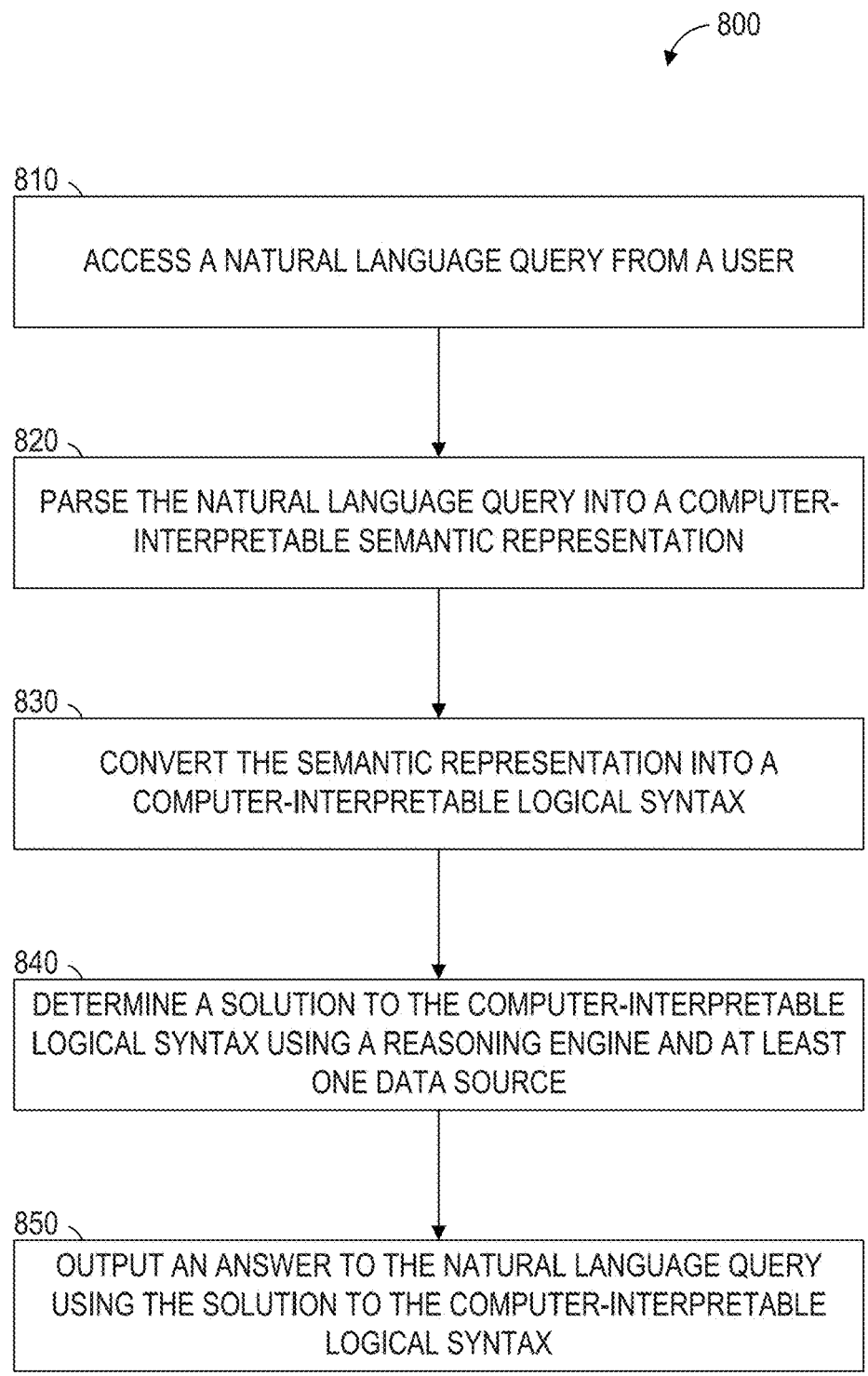
FIG. 8 is a flowchart illustrating operations of a server machine in performing a method of natural language processing, according to some example embodiments.

Referring to FIG. 8, flowchart 800 illustrates an example methodology according to some embodiments. The example methodology 800 may include one or more of operations 810, 820, 830, 840, and 850. One or more of operations 810-750 may be performed as part (e.g., a precursor task, a subroutine, or a portion) of operations discussed in FIG. 4. The example flowchart 800 may be implemented and performed by various devices, including, for example, system 105 and devices 130 and 150. These example method steps may be consistent with and/or sub-steps or sub-routines of the steps described in FIG. 4.

At block 810, in some embodiments, the method includes accessing a natural language query from a user. The natural language query may be written or verbalized in natural language. The query may originate from a user interface at a natural language processor of the present disclosures or may originate from a different source, and may be accessed by aspects of the present disclosures. Example queries are described throughout the disclosures, and embodiments are not so limited.

At block 820, the method may include parsing the natural language query into a computer-interpretable semantic representation. This step may be consistent with, for example, the parsing actions performed by the natural language parser 415 and associated steps 410, 420, and 425, as described in FIG. 4. Other examples of parsing are described in FIGS. 5, 6, and 7, and embodiments are not so limited.

At block 830, the method may include converting the semantic representation into a computer-interpretable logical syntax. This step may be consistent with, for example, the logical syntax converting actions performed by the natural language parser 415 and associated steps 410, 420, and 425, as described in FIG. 4. Other examples of parsing are described in FIGS. 5, 6, and 7, and embodiments are not so limited.

At block 840, the method may include determining a solution to the computer-interpretable logical syntax using a reasoning engine and at least one data source. An example reasoning engine may be reasoning engine 430 with associated blocks 435, 440, and 445 as described in FIG. 4. An example data source may be a knowledge database described in block 445, and/or the multiple databases described through the present disclosures.

At block 850, the method may include outputting an answer to the natural language query using the solution to the computer-interpretable logical syntax. The output may be of various formats, examples of which include example outputs as described in FIGS. 4, 5, 6, and 7.

Figure 9:
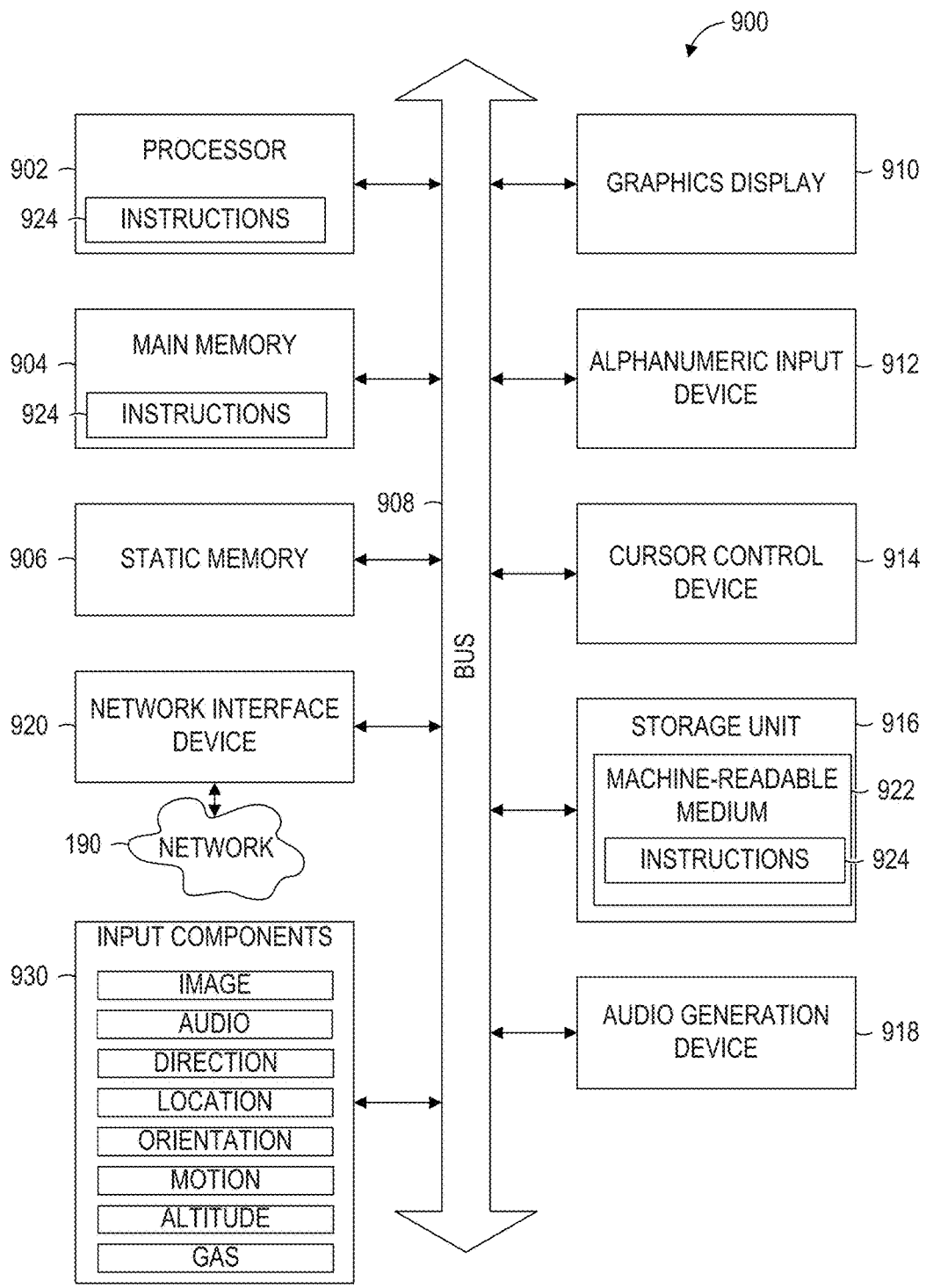
FIG. 9 is a block diagram illustrating components of a machine, according to some example embodiments, able to read instructions from a machine-readable medium and perform any one or more of the methodologies discussed herein.

Referring to FIG. 9, block diagram 900 illustrates components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein, including, for example, any of the descriptions of FIGS. 4, 5, 6, 7, and/or 8. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media (e.g., tangible and non-transitory machine-readable media). The instructions 924 may be transmitted or received over the network 190 via the network interface device 920. For example, the network interface device 920 may communicate the instructions 924 using any one or more transfer protocols (e.g., hypertext transfer protocol (HTTP)).

In some example embodiments, the machine 900 may be a portable computing device, such as a smart phone or tablet computer, and have one or more additional input components 930 (e.g., sensors or gauges). Examples of such input components 930 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems (e.g., apparatus) discussed herein:

1. A computer implemented method comprising:
accessing a natural language query from a user;
parsing the natural language query into a computer-interpretable semantic representation;
converting the semantic representation into a computer-interpretable logical syntax;
determining a solution to the computer-interpretable logical syntax using a reasoning engine and at least one data source; and
outputting an answer to the natural language query using the solution to the computer-interpretable logical syntax.

2. The method of description 1, further comprising:
deriving a term from the natural language query that is contained neither in the reasoning engine nor in the at least one data source; and wherein

17 determining the solution to the computer-interpretable logical syntax further uses the term contained neither in the reasoning engine nor in the at least one data source.

3. The method of description 1, wherein determining the solution to the computer-interpretable logical syntax comprises:

combining information from a first data source among the at least one data source with information from a second data source among the at least one data source; and synthesizing the combined information from the first data source and the second data source using the reasoning engine to generate the solution, wherein the solution is contained neither in the first data source nor the second data source.

4. The method of description 1 wherein:

the natural language query comprises a plurality of questions, and wherein an answer to a first question of the plurality of questions depends on an answer to a second question of the plurality of questions.

5. The method of description 4, wherein determining the solution to the computer-interpretable logical syntax comprises:

determining the answer to the second question of the plurality of questions; and determining the answer to the first question of the plurality of questions using at least the answer to the second question.

6. The method of description 1, wherein the natural language query comprises at least one semantically ambiguous term; and wherein determining the solution to the computer-interpretable logical syntax further uses the semantically ambiguous term.

7. The method of description 1, further comprising:

inferring at least two dissimilar terms in the natural language query to be semantically equivalent; and wherein determining the solution to the computer-interpretable logical syntax further uses the semantically equivalent inference.

8. A system comprising an input interface, an output interface, and at least one processor configured to perform any of the descriptions in descriptions 1 through 7.

9. A computer-readable medium embodying instructions that, when executed by a processor perform operations comprising any of the descriptions in descriptions 1 through 7.

10. An apparatus comprising means for perform any of the descriptions in descriptions 1 through 7.

What is claimed is:

1. A computer implemented method comprising:

accessing, using one or more hardware processors, a natural language query from a user;

parsing, using the one or more hardware processors, the natural language query into a computer-interpretable semantic representation of the natural language query, wherein the parsing comprises:

generating a set of clauses based on relationships among words included in the natural language query; and pruning a portion of the clauses to rewrite one or more syntactic patterns to semantic patterns of the query and to map the syntactic patterns onto semantic relations to correspond to the computer-interpretable semantic representation, the computer-interpretable semantic representation describing the set of clauses based on one or more aspects of the words and the relationships;

converting, using the one or more hardware processors, the computer-interpretable semantic representation into a computer-interpretable logical syntax, the converting using a set of axioms classifying terms of one or more of the computer interpretable semantic representation and the computer interpretable logical syntax according to at least one ontology;

determining, using the one or more hardware processors, a solution to the computer-interpretable logical syntax using a reasoning engine and at least one data source, the computer-interpretable logical syntax and set of axioms;

determining an answer by use of machine-oriented inference rules including resolution for general purpose reasoning and paramodulation for reasoning about equality; and outputting an answer to the natural language query using the solution to the computer-interpretable logical syntax.

2. The method of claim 1 wherein:

the natural language query comprises a plurality of questions, and wherein an answer to a first question of the plurality of questions depends on an answer to a second question of the plurality of questions.

3. The method of claim 2, wherein determining the solution to the computer-interpretable logical syntax comprises:

determining the answer to the second question of the plurality of questions; and determining the answer to the first question of the plurality of questions using at least the answer to the second question.

4. The method of claim 1, further comprising:

deriving a term from the natural language query that is contained neither in the reasoning engine nor in the at least one data source; and wherein determining the solution to the computer-interpretable logical syntax further uses the term contained neither in the reasoning engine nor in the at least one data source.

5. The method of claim 1, wherein determining the solution to the computer-interpretable logical syntax comprises:

combining information from a first data source among the at least one data source with information from a second data source among the at least one data source; and synthesizing the combined information from the first data source and the second data source using the reasoning engine to generate the solution; wherein the solution is contained neither in the first data source nor the second data source.

6. The method of claim 1, wherein the natural language query comprises at least one semantically ambiguous term; and wherein determining the solution to the computer-interpretable logical syntax further uses the semantically ambiguous term.

7. The method of claim 1, further comprising:

inferring at least two dissimilar terms in the natural language query to be semantically equivalent; and wherein determining the solution to the computer-interpretable logical syntax further uses the semantically equivalent inference.

8. A system comprising:

an input interface configured to access a natural language query from a user;

a processor configured to:

parse the natural language query into a computer-interpretable semantic representation of the natural language query, wherein the parsing comprises:
generating a set of clauses based on relationships among words included in the natural language query; and
pruning a portion of the clauses to rewrite one or more syntactic patterns to semantic patterns of the query and to map the syntactic patterns onto semantic relations to correspond to the computer-interpretable semantic representation, the computer-interpretable semantic representation describing the set of clauses based on one or more aspects of the words and the relationships;
convert the computer-interpretable semantic representation into a computer-interpretable logical syntax using a set of axioms classifying terms of one or more of the computer-interpretable semantic representation and the computer-interpretable logical syntax according to one or more ontologies, the converting using a set of axioms classifying terms of one or more of the computer interpretable semantic representation and the computer interpretable logical syntax according to the one or more ontologies;
determine a solution to the computer-interpretable logical syntax using a reasoning engine and at least one data source, the solution determined based on the computer-interpretable logical syntax and the set of axioms;
determine an answer by use of machine-oriented inference rules including resolution for general purpose reasoning and paramodulation for reasoning about equality; and
an output interface configured to output an answer to the natural language query using the solution to the computer-interpretable logical syntax.

9. The system of claim 8 wherein:
the natural language query comprises a plurality of questions, and wherein an answer to a first question of the plurality of questions depends on an answer to a second question of the plurality of questions.

10. The system of claim 9, wherein determining the solution to the computer-interpretable logical syntax comprises:
determining the answer to the second question of the plurality of questions; and
determining the answer to the first question of the plurality of questions using at least the answer to the second question.

11. The system of claim 8, wherein the processor is further configured to:
derive a term from the natural language query that is contained neither in the reasoning engine nor in the at least one data source; and
wherein determining the solution to the computer-interpretable logical syntax further uses the term contained neither in the reasoning engine nor in the at least one data source.

12. The system of claim 8, wherein the processor is further configured to:
combine information from a first data source among the at least one data source with information from a second data source among the at least one data source; and
synthesize the combined information from the first data source and the second data source using the reasoning engine to generate the solution, wherein the solution is contained neither in the first data source nor the second data source.

13. The system of claim 8, wherein the natural language query comprises at least one semantically ambiguous term; and
wherein determining the solution to the computer-interpretable logical syntax further uses the semantically ambiguous term.

14. The system of claim 8, wherein the processor is further configured to:
infer at least two dissimilar terms in the natural language query to be semantically equivalent; and
wherein determining the solution to the computer-interpretable logical syntax further uses the semantically equivalent inference.

15. A non-transitory computer-readable medium embodying instructions that, when executed by a processor perform operations comprising:
accessing a natural language query from a user;
parsing, using one or more hardware processor, the natural language query into a computer-interpretable semantic representation of the natural language query, wherein the parsing comprises:
generating a set of clauses based on relationships among words included in the natural language query; and
pruning a portion of the clauses to rewrite one or more syntactic patterns to semantic patterns of the query and to map the syntactic patterns onto semantic relations to correspond to the computer-interpretable semantic representation, the computer-interpretable semantic representation describing the set of clauses based on one or more aspects of the words and the relationships;
converting, using the one or more hardware processor, the computer-interpretable semantic representation into a computer-interpretable logical syntax using a set of axioms classifying terms of one or more of the computer-interpretable semantic representation and the computer-interpretable logical syntax according to one or more ontologies, the converting using a set of axioms classifying terms of one or more of the computer interpretable semantic representation and the computer interpretable logical syntax according to the one or more ontologies;
determining, using the one or more hardware processor, a solution to the computer-interpretable logical syntax using a reasoning engine and at least one data source, the solution determined based on the computer-interpretable logical syntax and the set of axioms;
determining an answer by use of machine-oriented inference rules including resolution for general purpose reasoning and paramodulation for reasoning about equality; and
outputting an answer to the natural language query using the solution to the computer-interpretable logical syntax.

16. The non-transitory computer-readable medium of claim 15 wherein:
the natural language query comprises a plurality of questions, and wherein an answer to a first question of the plurality of questions depends on an answer to a second question of the plurality, of questions.

17. The non-transitory computer-readable medium of claim 16, wherein determining the solution to the computer-interpretable logical syntax comprises:
determining the answer to the second question of the plurality of questions; and
determining the answer to the first question of the plurality of questions using at least the answer to the second question.

18. The non-transitory computer-readable medium of claim 15, wherein the instructions further cause the processor to perform operations comprising:
- deriving a term from the natural language query that is contained neither in the reasoning engine nor in the at least one data source; and
- wherein determining the solution to the computer-interpretable logical syntax further uses the term contained neither in the reasoning engine nor in the at least one data source.

19. The non-transitory computer-readable medium of claim 15, wherein determining the solution to the computer-interpretable logical syntax comprises:
- combining information from a first data source among the at least one data source with information from a second data source among the at least one data source; and
- synthesizing the combined information from the first data source and the second data source using the reasoning engine to generate the solution, wherein the solution is contained neither in the first data source nor the second data source.

20. The non-transitory computer-readable medium of claim 15, wherein the natural language query comprises at least one semantically ambiguous term; and
- wherein determining the solution to the computer-interpretable logical syntax further uses the semantically ambiguous term.

* * * * *